United States Patent
Nishida

(10) Patent No.: US 8,769,667 B2
(45) Date of Patent: Jul. 1, 2014

(54) INFORMATION PROCESSING APPARATUS

(75) Inventor: Tsuyoshi Nishida, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1181 days.

(21) Appl. No.: 11/961,989

(22) Filed: Dec. 20, 2007

(65) Prior Publication Data
US 2008/0163360 A1 Jul. 3, 2008

(30) Foreign Application Priority Data
Dec. 27, 2006 (JP) .................................. 2006-352313

(51) Int. Cl.
| | |
|---|---|
| *G06F 21/00* | (2013.01) |
| *G06F 21/70* | (2013.01) |
| *G06F 21/78* | (2013.01) |
| G06F 21/57 | (2013.01) |
| G06F 21/74 | (2013.01) |
| G06F 21/60 | (2013.01) |

(52) U.S. Cl.
CPC ................ *G06F 21/70* (2013.01); *G06F 21/78* (2013.01); *G06F 21/572* (2013.01); *G06F 21/74* (2013.01); *G06F 21/60* (2013.01)
USPC .......................................................... 726/17

(58) Field of Classification Search
CPC ......... G06F 21/70; G06F 21/74; G06F 21/78; G06F 21/60; G06F 21/572
USPC ....................................................... 726/2, 17
See application file for complete search history.

(56) References Cited

U.S. PATENT DOCUMENTS

| | | | | |
|---|---|---|---|---|
| 6,098,171 | A | * | 8/2000 | Johnson et al. .................. 726/16 |
| 2006/0037084 | A1 | * | 2/2006 | Brown et al. .................... 726/28 |
| 2006/0069819 | A1 | | 3/2006 | Corbett |
| 2009/0158441 | A1 | * | 6/2009 | Mohler et al. .................. 726/27 |

FOREIGN PATENT DOCUMENTS

| | | |
|---|---|---|
| JP | A 2006-58949 | 2/2006 |
| JP | A 2006-99776 | 4/2006 |

* cited by examiner

*Primary Examiner* — Michael S McNally
(74) *Attorney, Agent, or Firm* — Knobbe, Martens, Olson & Bear LLP

(57) ABSTRACT

An information processing apparatus includes firmware incorporated in the apparatus; utility software that can be installed and uninstalled; a first restricting unit; and a second restricting unit. The information processing apparatus executes the firmware and the utility software to access a device. The firmware uses the first restricting unit to restrict use of the device on the basis of restriction information, supplies the restriction information to the utility software, and removes the restriction by the first restricting unit if an instruction to remove the restriction is received from the utility software. The utility software determines whether the use of the device has already been restricted by the second restricting unit when the utility software receives the restriction information from the firmware, and instructs the firmware to remove the restriction by the first restricting unit if the use of the device has already been restricted by the second restricting unit.

10 Claims, 7 Drawing Sheets

INFORMATION PROCESSING APPARATUS

CROSS-REFERENCE TO RELATED APPLICATIONS

This application claims the benefit of priority of Japanese Patent Application No. 2006-352313, filed Dec. 27, 2006, the entire contents of which are incorporated herein by reference.

BACKGROUND

1. Field

The present invention relates to information processing apparatuses and, more particularly, to an information processing apparatus to which various devices, such as a USB device, can be connected.

2. Description of the Related Art

USB devices, such as USB storages or USB mice, or PCI/IDE devices, such as optical disk drives, can be detachably connected to information processing apparatuses, such as personal computers.

Some of the above devices have important information and/or secret information stored therein. Only certain persons, for example, the managers of the information processing apparatuses are permitted to access such devices, and the other general users are inhibited from accessing such devices or performing specific operations to such devices.

JP-A 2006-58949 discloses a technology relating to USB devices, the use of which is restricted for every user.

There are two approaches to impose use restriction and functional restriction (hereinafter collectively referred to as access restriction) on a device at the information processing apparatus side, rather than at the device side.

One approach is to impose the access restriction on the device by utility software (hereinafter simply referred to as a utility) in the OS. This approach has the advantage of setting the content of the access restriction in detail. For example, it is possible to permit readout of data from an optical disk drive and to inhibit writing of data on the optical disk drive. However, when the utility is uninstalled or the OS is reinstalled, this approach has the disadvantage of easily disabling the set access restriction.

The other approach is to impose the access restriction on the device in the level of firmware, that is, in the BIOS level. In this case, the access restriction cannot be easily externally removed because the BIOS is incorporated in the device. However, it is difficult to set the access restriction in detail in the BIOS level. For example, when the access restriction is to be imposed on a USB storage, the access restriction is imposed on all the USB devices. As a result, it is not possible to use even the mouse, thereby loosing the flexibility and damaging the usability.

SUMMARY OF THE INVENTION

Accordingly, it is an object of the present invention to provide an information processing apparatus capable of imposing access restriction on a device with higher usability in a manner such that the access restriction cannot be easily removed.

According to an embodiment of the present invention, an information processing apparatus includes firmware incorporated in the apparatus; utility software that can be installed and uninstalled; a first restricting unit; and a second restricting unit. The information processing apparatus executes the firmware and the utility software to access a device. The firmware uses the first restricting unit to restrict use of the device on the basis of restriction information, supplies the restriction information to the utility software, and removes the restriction by the first restricting unit if an instruction to remove the restriction is received from the utility software. The utility software determines whether the use of the device has already been restricted by the second restricting unit when the utility software receives the restriction information from the firmware, and instructs the firmware to remove the restriction by the first restricting unit if the use of the device has already been restricted by the second restricting unit.

The information processing apparatus according to the present invention can impose the access restriction on a device with higher usability in a manner such that the access restriction cannot be easily removed.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

Information processing apparatuses according to embodiments of the present invention will herein be described with reference to the attached drawings.

First Exemplary Embodiment

Figure 1:
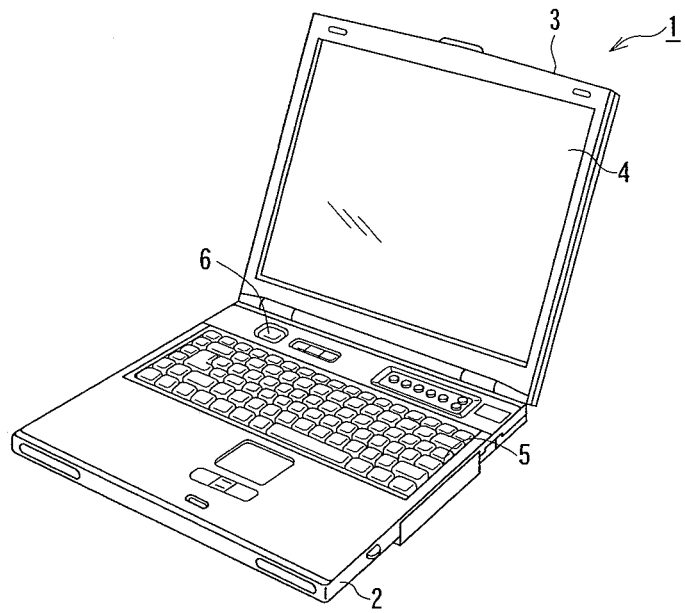
FIG. 1 is an external view of an information processing apparatus according to embodiments of the present invention.

FIG. 1 is an external view of a notebook-sized personal computer to which an information processing apparatus 1 according to a first embodiment of the present invention is applicable.

The information processing apparatus 1 includes a thin rectangular main body 2 and a panel unit 3. The main body 2 of the information processing apparatus 1 is openably and closably connected to the panel unit 3 via a hinge unit.

The main body 2 of the information processing apparatus 1 has, for example, a keyboard 5 and a power switch 6 on the upper surface thereof. The keyboard 5 is used to input a variety of data and to perform various operations. The power switch 6 is used to turn on or off the information processing apparatus 1. The main body 2 of the information processing apparatus 1 includes a system board on which electronic components (refer to FIG. 2) including a CPU 10 and a main memory 12 are mounted and external storage devices including a CD or DVD drive (optical disk drive) 31 and a hard disk drive (HDD) 32. USB devices, such as a USB storage 21, can be connected to the main body 2 of the information processing apparatus 1.

The panel unit 3 has a display device 4 in the opening on the inner surface thereof. A variety of information and images are displayed in the display device 4.

Figure 2:
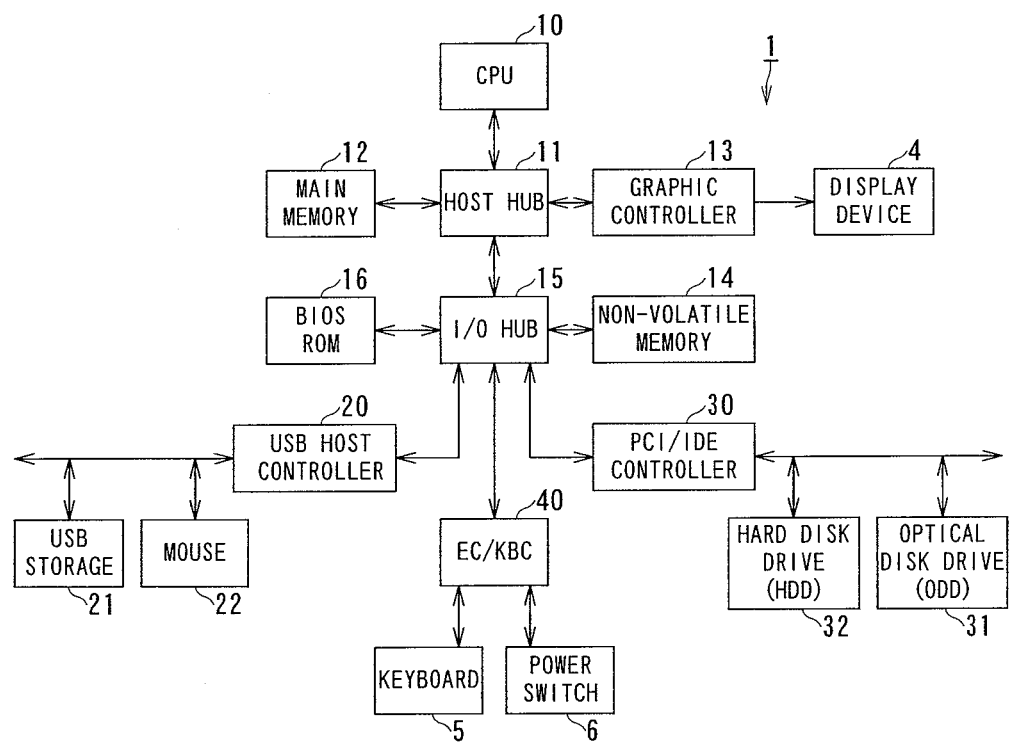
FIG. 2 is a block diagram showing an example of the hardware configuration of the information processing apparatus according to the embodiments of the present invention.

FIG. 2 is a block diagram showing an example of the hardware configuration of the information processing apparatus 1. The information processing apparatus 1 includes the CPU 10 controlling the entire information processing apparatus 1. The CPU 10 transfers data to and from various internal components via a host hub 11 and an I/O hub 15.

The internal components in the information processing apparatus 1 include the main memory 12, a BIOS ROM 16, and a non-volatile memory 14. The main memory 12 temporarily stores programs and data and functions as a working area of the CPU 10. The BIOS ROM 16 stores the BIOS. The non-volatile memory 14 stores necessary data.

A USB host controller 20 controlling the various USB devices and a PCI/IDE controller 30 controlling PCI devices and IDE devices are connected to the I/O hub 15. The USB storage 21 including, for example, a flash memory and a mouse 22 are connected to the USB host controller 20. The optical disk drive 31 used to read out and write data from and on an optical disc, such as a CD or a DVD, and the hard disk drive (HDD) 32 are connected to the PCI/IDE controller 30.

An EC/KBC (Embedded Controller/KeyBoard Controller) 40, which is a built-in processor, is also connected to the I/O hub 15. The keyboard 5 and the power switch 6 are connected to the EC/KBC 40.

The USB host controller 20 and the PCI/IDE controller 30 may be included in the I/O hub 15.

Figure 3:
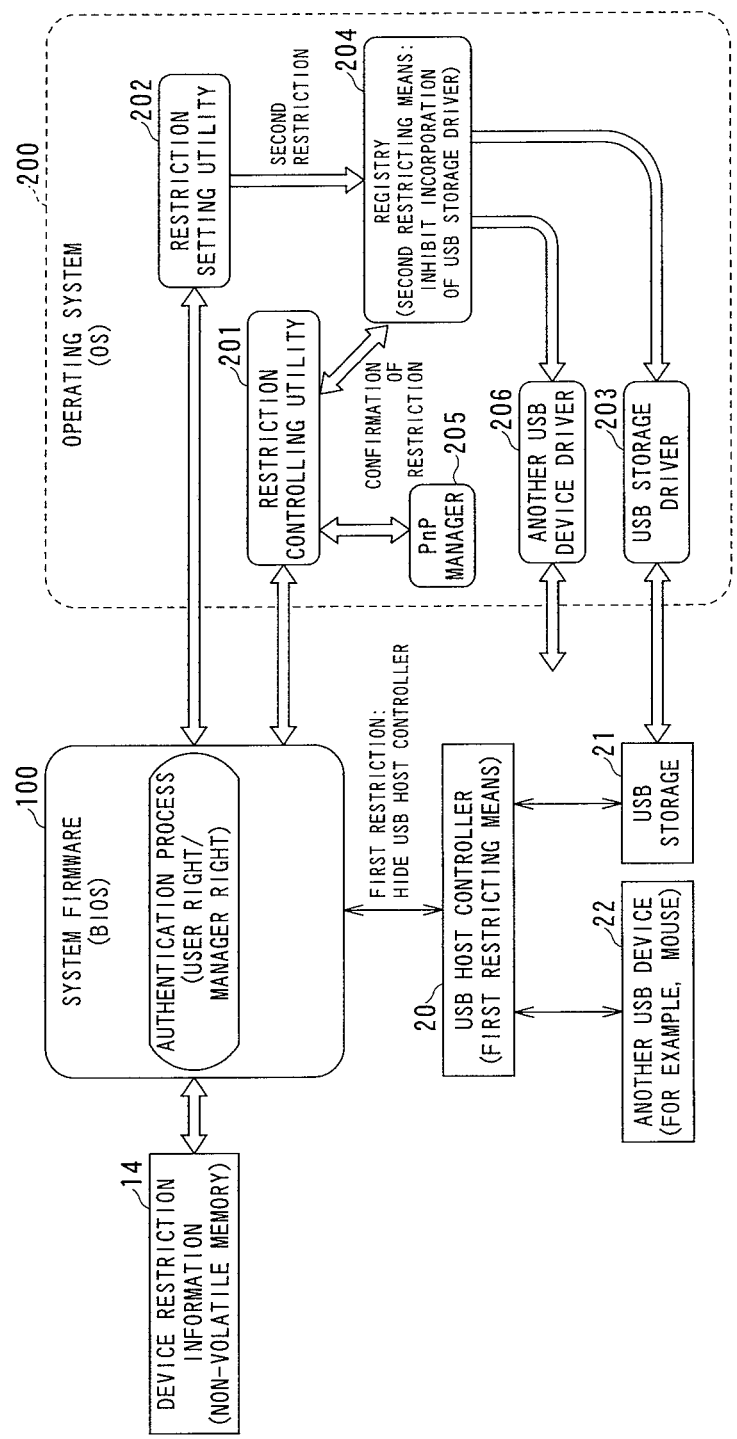
FIG. 3 illustrates an example of the software configuration of an information processing apparatus according to a first embodiment of the present invention and related hardware.

The information processing apparatus 1 includes, as software, a BIOS 100 serving as system firmware and an OS 200, as shown in FIG. 3.

The BIOS 100 is incorporated in the information processing apparatus 1 as firmware. The BIOS 100 is first up and run at startup of the information processing apparatus 1. The BIOS 100 is stored in the BIOS ROM 16 and cannot be removed (uninstalled) by a normal operation. The BIOS 100 is read out from the BIOS ROM 16 and is executed by the CPU 10.

The OS 200 is stored in the hard disk drive 32 along with a variety of application software. The OS 200 is activated by the BIOS 100 and is executed by the CPU 10 after the activation. The OS 200 includes a variety of utility software (hereinafter simply referred to as utilities) and a variety of driver software (hereinafter simply referred to as drivers) controlling various devices.

In the information processing apparatus 1 according to the first embodiment of the present invention, the BIOS 100 cooperates with the OS 200 to impose access restriction on each device connected to the information processing apparatus 1. The device access restriction means that use of a certain device, for example, a USB storage is inhibited or that use of the device is permitted but a specific function, for example, writing of data on the optical disk drive 31 is inhibited.

Enforcing the device access restriction in the information processing apparatus 1 prevents a general user from leaking specific important information or from tampering information.

FIG. 3 illustrates an example of the function of the BIOS 100 and the OS 200 mainly involved in the device access restriction. Hardware related to the access restriction is also illustrated in FIG. 3.

According to the first embodiment of the present invention, a restriction setting utility 202 and a restriction controlling utility 201 are provided in the OS 200. The restriction setting utility 202 and the restriction controlling utility 201 cooperate with the BIOS 100 to impose the device access restriction.

Figure 4:
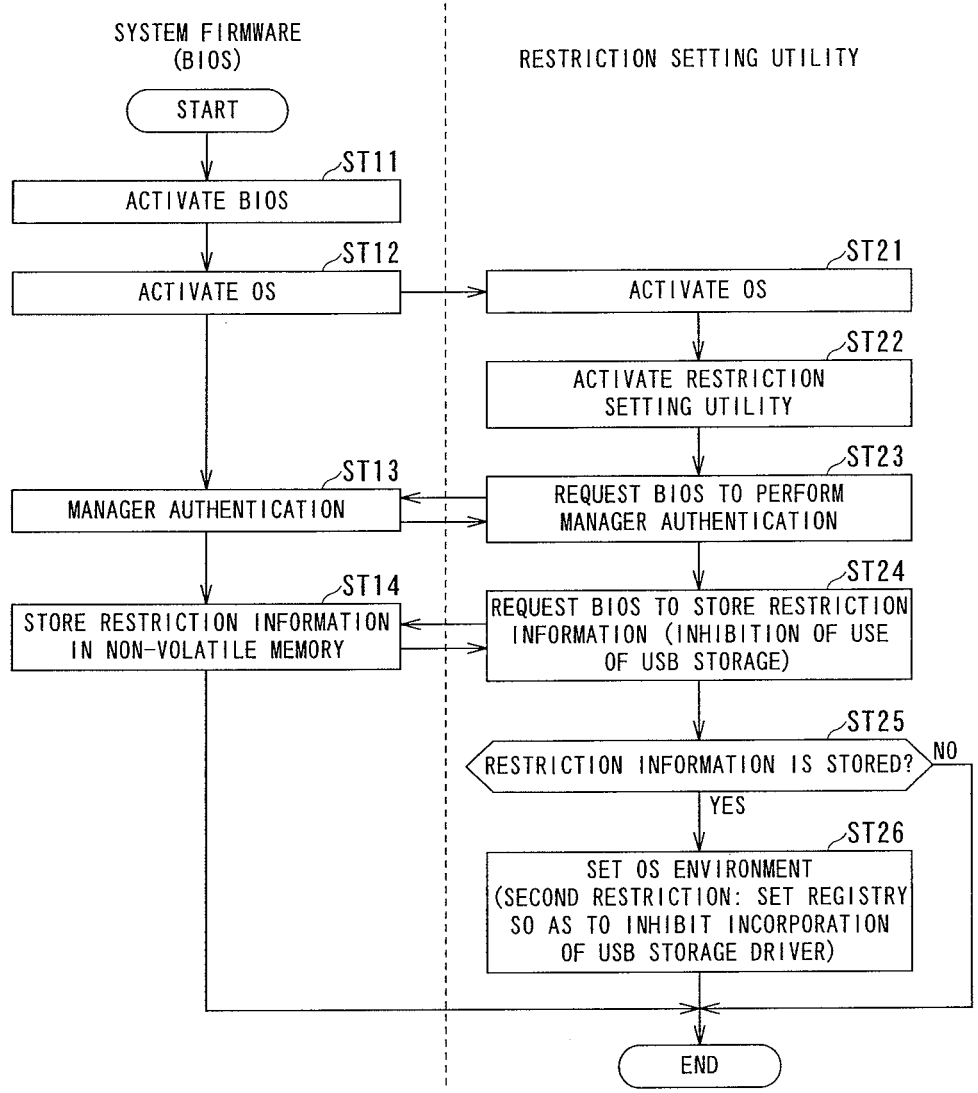
FIG. 4 is a flowchart showing an example of the operation of a BIOS and a restriction setting utility (restriction setting phase) according to the first embodiment of the present invention.
Figure 5:
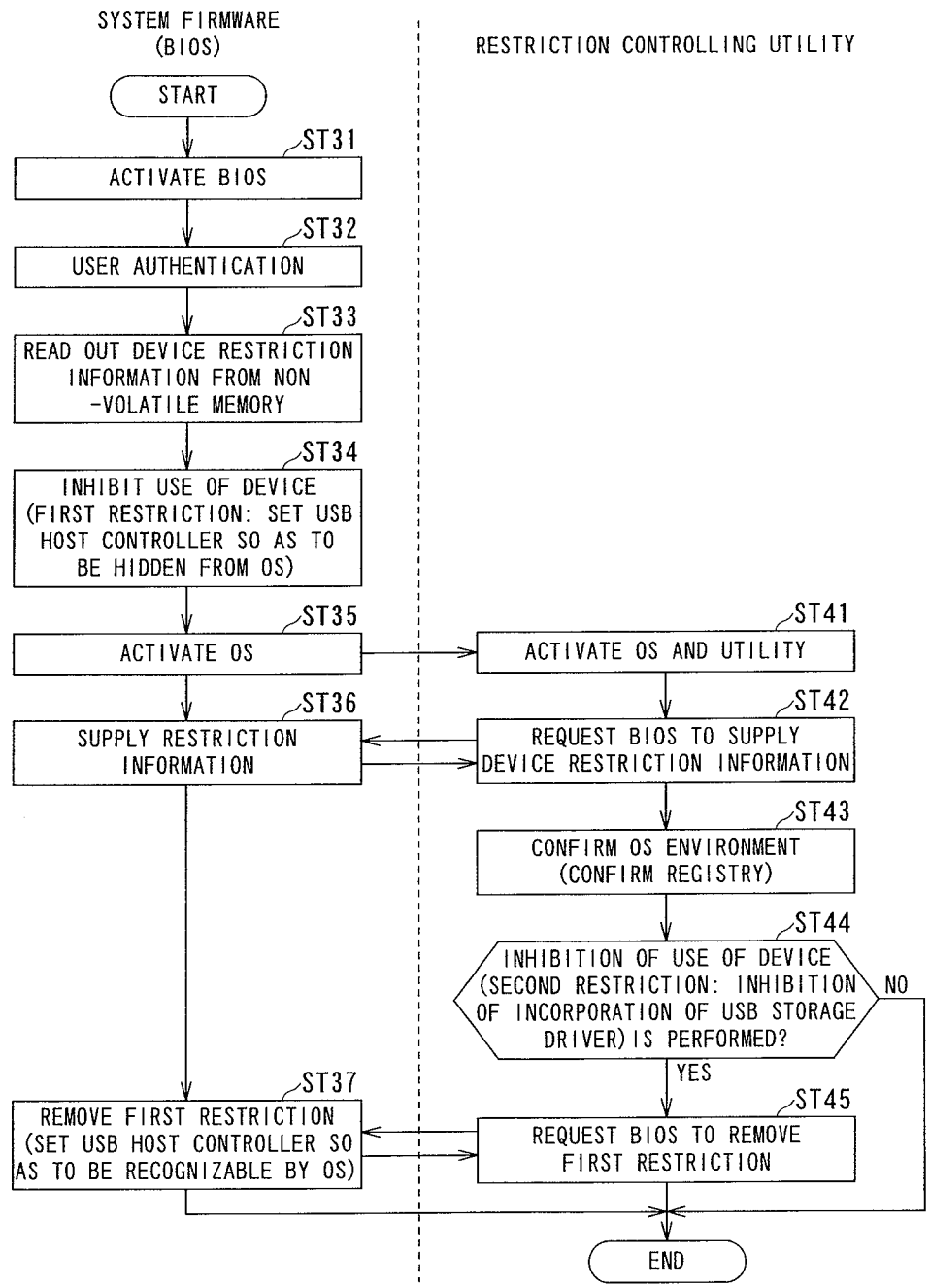
FIG. 5 is a flowchart showing an example of the operation of the BIOS and a restriction controlling utility (restriction enforcing phase) according to the first embodiment of the present invention.

FIGS. 4 and 5 are flowcharts showing examples of processes of restricting access to devices according to the first embodiment of the present invention. FIG. 4 is a flowchart showing an example of a process of setting the access restriction (restriction setting phase), in which the BIOS 100 and the restriction setting utility 202 are executed to set the restriction on a device.

FIG. 5 a flowchart showing an example of a control process based on the set access restriction (restriction enforcing phase), in which the BIOS 100 and the restriction controlling utility 201 are executed to control a device.

The processes of restricting access to devices according to the first embodiment of the present invention will now be described with reference to FIGS. 3 to 5. According to the first embodiment of the present invention, the device access restriction is exemplified by inhibition of use of the USB storage 21 among the USB devices by the general user.

The access restriction is set by the manager of the information processing apparatus 1. Referring to FIG. 4, in Step ST11, the manager activates the BIOS 100. In Step ST12 and Step ST21, the manager activates the OS 200. In Step ST22, the manager activates the restriction setting utility 202.

In Step ST23, the restriction setting utility 202 requests the BIOS 100 to perform manager authentication. In Step ST13, the BIOS 100 performs the manager authentication in response to the request.

If the manager authentication succeeds, that is, if the current operator is the manager, the BIOS 100 indicates to the restriction setting utility 202 that the manager authentication succeeds. The restriction setting utility 202 receives the indication and displays a window for setting the device access restriction in the display device 4 to wait for an input by the manager.

The manager sets the inhibition of the use of the USB storage 21 and registers the inhibition of the use of the USB storage 21 as device restriction information. In Step ST24, the restriction setting utility 202 supplies the registered restriction information to the BIOS 100 to request the BIOS 100 to store the restriction information.

In Step ST14, the BIOS 100 receives the request to store the restriction information, stores the restriction information in the non-volatile memory 14, and indicates to the restriction setting utility 202 whether the storage succeeds or fails.

In Step ST25, the restriction setting utility 202 determines whether the storage of the restriction information in the non-volatile memory 14 is completed. If the restriction setting utility 202 determines that the storage is completed, then in Step ST26, the restriction setting utility 202 sets the OS environment. Specifically, the restriction setting utility 202 sets a registry 204 (second restricting means, refer to FIG. 3) so as not to incorporate a USB storage driver 203. With this setting, the USB storage driver 203 is not incorporated when the information processing apparatus 1 is next activated and it is not possible to use the USB storage 21.

If the restriction setting utility 202 determines in Step ST25 that the storage of the restriction information in the non-volatile memory 14 is not completed, the restriction setting utility 202 skips the setting in the registry 204 and terminates.

The inhibition of the use of the USB storage 21 is set in the above manner.

The control process of the device in the information processing apparatus 1 in which the use of the USB storage 21 is inhibited will now be described with reference to FIG. 5.

The information processing apparatus 1 is turned on and, in Step ST31, the BIOS 100 is activated. In Step ST32, the BIOS 100 performs user authentication. The BIOS 100 determines by the user authentication whether the BIOS 100 is activated by the general user (activation by the general user right) or is activated by the manager (activation by the manager right).

In Step ST33, the BIOS 100 reads out the device restriction information from the non-volatile memory 14. Specifically, the restriction information indicating that the use of the USB storage 21 is inhibited is read out from the non-volatile memory 14.

When the BIOS 100 is activated by the manager right, the BIOS 100 re-determines that no restriction is included in the readout restriction information. In other words, the BIOS 100 re-determines that the inhibition of the use of the USB storage 21 is not set in the restriction information.

In contrast, when the BIOS 100 is activated by the general user right, the BIOS 100 first imposes the device access restriction (first restriction) on the basis of the readout restriction information. Specifically, in Step ST34, the BIOS 100 sets the USB host controller 20 (first restricting means) so as to be hidden from the OS 200 to inhibit the USB storage 21 from being used. With this setting, not only the USB storage 21 but also the all other USB devices, such as the mouse 22, connected to the USB host controller 20 are inhibited from being used.

After inhibiting the USB storage 21 from being used, in Step ST35, the BIOS 100 activates the OS 200. In Step ST41, the activation of the OS 200 activates a utility that is set in advance, specifically, activates the restriction controlling utility 201.

In Step ST42, the restriction controlling utility 201 requests the BIOS 100 to supply the restriction information read out from the non-volatile memory 14. In Step ST36, the BIOS 100 supplies the restriction information to the restriction controlling utility 201 in response to the request.

In Step ST43, the restriction controlling utility 201 confirms that the OS environment is set so as to realize the device access restriction corresponding to the supplied restriction information. In Step ST44, the restriction controlling utility 201 determines whether the registry 204 is set so as not to execute the USB storage driver 203 (second restriction).

If the registry 204 is set so as not to execute the USB storage driver 203 (the affirmative in Step ST44), the inhibition of the use of the USB storage 21 is ensured. Accordingly, in Step ST45, the restriction controlling utility 201 requests the BIOS 100 to remove the access restriction (the first restriction) set by the BIOS 100.

In Step ST37, the BIOS 100 removes the first restriction in response to the request. Specifically, the BIOS 100 resets the USB host controller 20, which is hidden from the OS 200, so as to be recognizable from the OS 200.

Then, the BIOS 100 requests a PnP (plug-and-play) manager 205 in the OS 200 to perform rescanning. At this stage, a USB device, such as the mouse 22, other than the USB storage 21 is recognized by the OS 200 and can be used.

If the restriction controlling utility 201 determines in Step ST44 that the OS environment is not put into place, that is, the registry 204 is not set so as inhibit the execution of the USB storage driver 203 (the negative in Step ST44), the first restriction is not removed and the inhibition of the use of the USB device set in the BIOS 100 is continued. Although the use of another USB device, such as the mouse 22, is also inhibited, the inhibition of the use of the USB storage 21, which is intended by the manager, is ensured.

When the restriction controlling utility 201 is uninstalled or when the restriction controlling utility 201 is not activated due to reinstallation of the OS 200, Step ST41 and the subsequent steps are not performed. Also in this case, the first restriction set by the BIOS 100 in Step ST34 is kept, thus ensuring the inhibition of the use of the USB storage 21 intended by the manager.

Second Exemplary Embodiment

According to a second embodiment of the present invention, the information processing apparatus 1 permits use of a specific device but inhibits a specific function of the device. Specifically, readout of data from the optical disk drive 31 is permitted and only writing of data in the optical disk drive 31 is inhibited in the second embodiment of the present invention. Since the basic operation according to the second embodiment of the present invention is similar to that according to the first embodiment of the present invention, only the differences are focused on.

Figure 6:
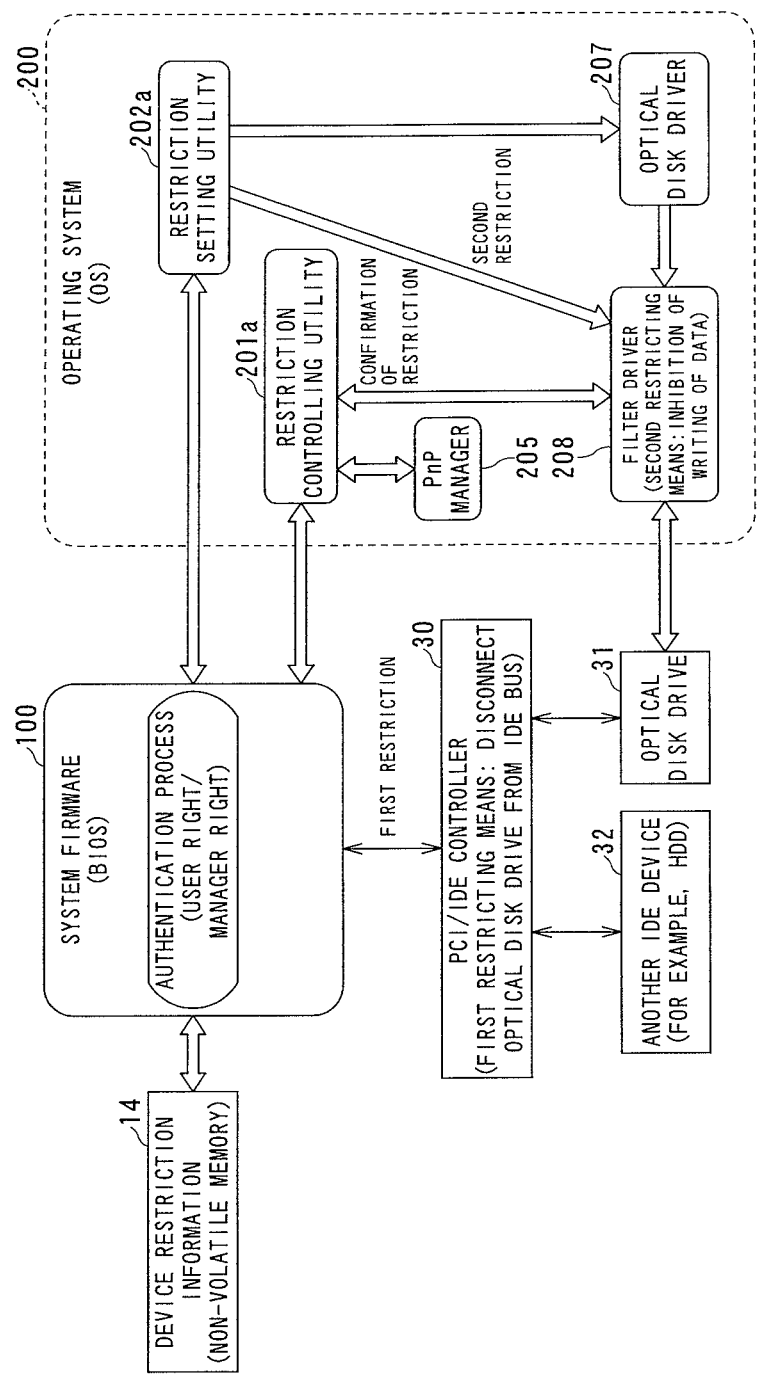
FIG. 6 illustrates an example of the software configuration of an information processing apparatus according to a second embodiment of the present invention and related hardware.

FIG. 6 illustrates an example of the software configuration of the BIOS 100 and the OS 200 according to the second embodiment of the present invention, as in FIG. 3.

The optical disk drive 31 operates under the control of the PCI/IDE controller 30. The access restriction (first restriction) by the BIOS 100 is performed to the PCI/IDE controller 30 (first restricting means).

A restriction setting utility 202a and a restriction controlling utility 201a in the OS 200 imposes the access restriction (second restriction) on a filter driver 208 (second restricting means) in an optical disk driver 207 and confirms the access restriction thereon.

Figure 7:
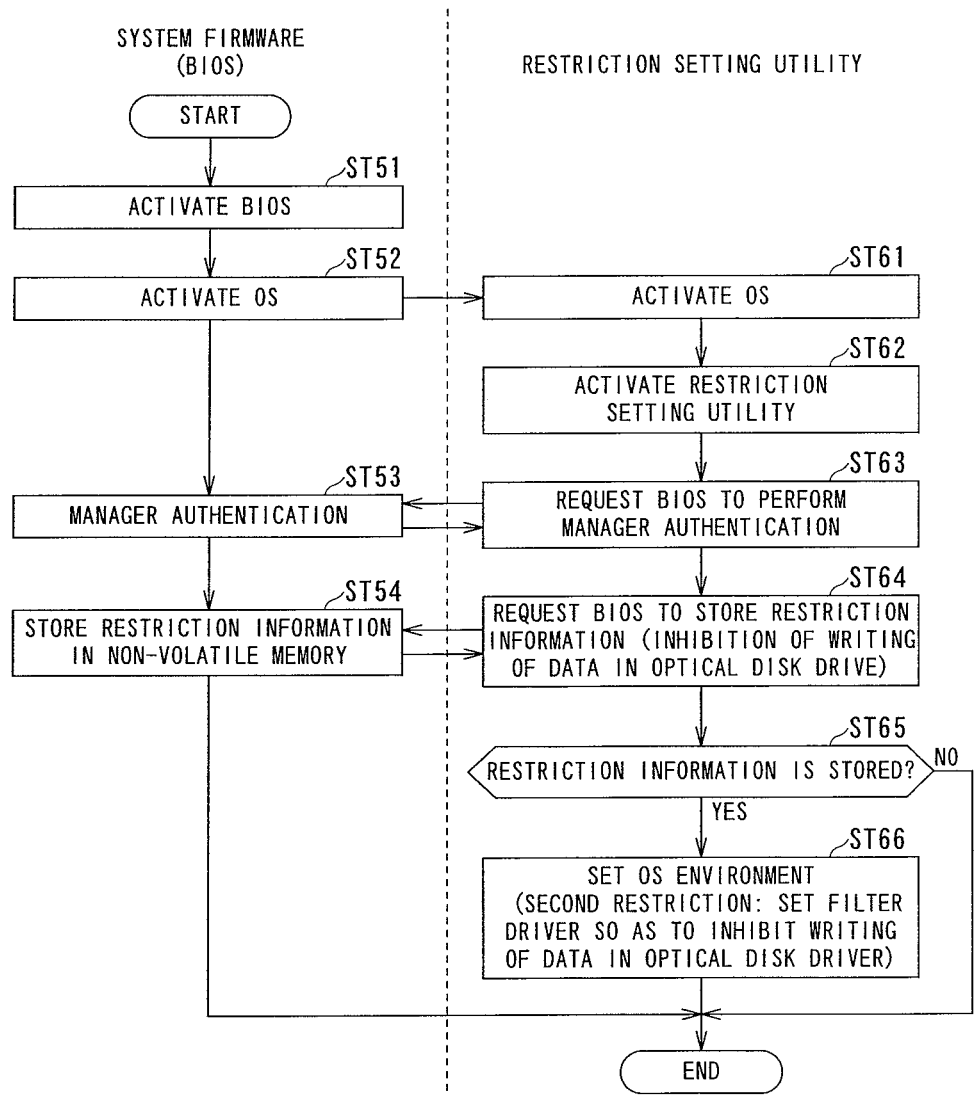
FIG. 7 is a flowchart showing an example of the operation of the BIOS and a restriction setting utility (restriction setting phase) according to the second embodiment of the present invention.
Figure 8:
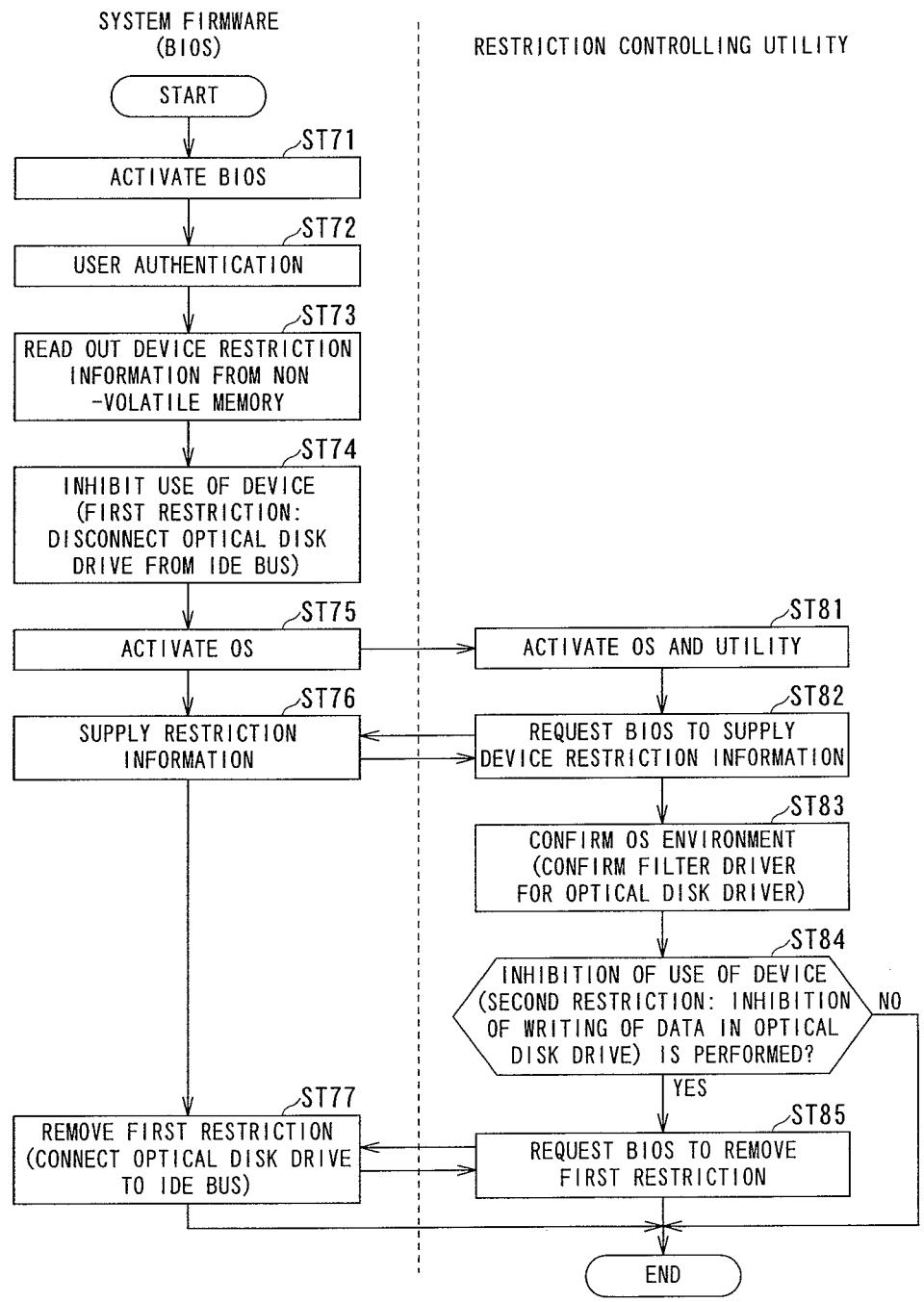
FIG. 8 is a flowchart showing an example of the operation of the BIOS and a restriction controlling utility (restriction enforcing phase) according to the second embodiment of the present invention.

FIGS. 7 and 8 are flowcharts showing examples of processes of restricting access to devices according to the second embodiment of the present invention. FIG. 7 shows an example of a process of setting inhibition of writing of data in the optical disk drive 31 (restriction setting phase). FIG. 8 shows an example of a process of enforcing the restriction (restriction enforcing phase). FIGS. 7 and 8 correspond to FIGS. 4 and 5 according to the first embodiment of the present invention, respectively.

Steps ST51 to ST63 in the process shown in FIG. 7 are basically similar to Steps ST11 to ST23 in the process shown in FIG. 4. The process shown in FIG. 7 differs from the process shown in FIG. 4 in Step ST64 in which the restriction setting utility 202a requests the BIOS 100 to store the restriction information. According to the second embodiment of the present invention, the restriction information is the inhibition of writing of data in the optical disk drive 31.

In the setting of the OS environment (the second restriction) in Step ST66, the inhibition of writing of data in the optical disk drive 31 is set in the filter driver 208. Specifically, the OS environment is set so as to incorporate the filter driver 208 (the second restricting means), which prevents a writing command from being passed to the optical disk drive 31.

Although the process shown in FIG. 8 is basically similar to the process shown in FIG. 5 according to the first embodiment of the present invention, the process shown in FIG. 8 differs from the process shown in FIG. 5 in Step ST74 in which the BIOS 100 enforces the first restriction. According to the second embodiment of the present invention, the BIOS 100 sets the register in the PCI/IDE controller 30 so as to disconnect the optical disk drive 31 from the IDE bus (the first restriction). As a result, the optical disk drive 31 is inhibited from being used.

In the confirmation of the OS environment in Steps ST83 and ST84, the restriction controlling utility 201a determines whether the filter driver 208 is incorporated, which prevents the writing command from being passed to the optical disk drive 31.

If the filter driver 208 is incorporated, then in Step S85, the restriction controlling utility 201a requests the BIOS 100 to remove the first restriction. In Step ST77, the BIOS 100 changes the settings of the register in the PCI/IDE controller 30 in response to the request and connects the optical disk drive 31 to the IDE bus. Then, the BIOS 100 requests the PnP manager 205 in the OS 200 to perform rescanning. At this stage, the optical disk drive 31 is recognized by the OS 200 and it is possible to use the optical disk drive 31. However, since the filter driver 208, which prevents the writing command from being passed to the optical disk drive 31, is incorporated in the OS 200, the writing of data in the optical disk drive 31 is inhibited.

Other Embodiments

Although the BIOS 100 re-determines that no restriction is included in the readout restriction information when the BIOS 100 is activated by the manager right in Step ST33 (ST73 in the second embodiment), the re-determination may not be performed even when the BIOS 100 is activated by the manager right. No distinction between the general user and the manager can simplify the process flow and causes no significant problem. This is because the manager can access the restriction setting utility 202. When the manager wants to remove the access restriction, it is sufficient for the manager to access the restriction setting utility 202 to remove the set access restriction.

Although the BIOS 100 requests the PnP manager 205 to perform the rescanning of the device after Step ST37 (Step ST77 in the second embodiment) in the above description, the restriction controlling utility 201 (the restriction controlling utility 201a in the second embodiment) may request the PnP manager 205 to perform the rescanning of the device.

In addition, a step for verifying the validity of the restriction controlling utility 201, which requests the removal of the first restriction, may be added before the BIOS 100 removes the first restriction in Step ST37. For example, the identification number of the true restriction controlling utility 201 is stored in advance in the BIOS 100, the identification number of the restriction controlling utility 201 is supplied from the restriction controlling utility 201 to the BIOS 100 along with the request to remove the first restriction, and the BIOS 100 compares the identification number stored in the BIOS 100 with the identification number supplied from the restriction controlling utility 201 to verify the validity of the restriction controlling utility 201. Only if the verification succeeds, the first restriction is removed. The addition of such a step can prevent the false restriction controlling utility 201 from requesting the removal of the first restriction, thus improving the reliability.

Furthermore, the device may be provided with functions equivalent to the access restriction performed by the restriction setting utility 202 and the restriction setting utility 202a, for example, equivalent to the setting of the registry to inhibit the use of the USB storage 21 or the incorporation of the filter driver 208 inhibiting the writing of data. In this case, the restriction controlling utility 201 supplies a command for the access restriction to the device and the device performs the access restriction in response to the supplied command.

Although the access restriction is exemplified by the inhibition of the use of the USB storage 21 and the inhibition of writing of data in the optical disk drive 31, the access restriction is not limited to them.

For example, the access restriction may be restriction on the rate of communication with a communication device, restriction on the power transmitted to a wireless communication device, inhibition of writing of data in a storage device other than the optical disk, or inhibition of a format.

As described above, with the information processing apparatuses according to the embodiments of the present invention, it is possible to impose the access restriction on a device with higher usability in a manner such that the access restriction cannot be easily removed.

It will be further understood by those skilled in the art that the foregoing description is of the preferred embodiments of the present invention and that various changes and modifications may be made to the invention without departing from the spirit and scope thereof.

What is claimed is:

1. An information processing apparatus comprising:
a memory configured to store restriction information for imposing an access restriction on devices or functions of a device, the device(s) connected to the apparatus;
a BIOS, stored in a BIOS-ROM and executed by the apparatus, said BIOS being configured to impose a first restriction on the devices or functions of the device when the BIOS is activated, the first restriction imposing the access restriction collectively on use of all the devices or on all of the functions of the device; and
an OS that can be installed into and uninstalled from the apparatus, the OS including a restriction setting utility and a restriction controlling utility, and the restriction setting utility setting a second restriction imposing the access restriction separately on the use of each of the devices or on each of the functions of the device,
wherein said BIOS cooperates with the OS such that:
said BIOS imposes the first restriction on the device when the apparatus is activated,
said restriction controlling utility of the OS receive the restriction information from the BIOS after the first restriction is imposed by the BIOS, the restriction information corresponding to the second restriction and having been stored by the BIOS in a non-volatile memory,
said restriction controlling utility of the OS verifies whether the second restriction is currently set in an OS environment,
said restriction controlling utility of the OS sends an instruction to remove the first restriction to said BIOS when it is verified that the second restriction has been set, and does not send the instruction to said BIOS when it is not verified that the second restriction has been set, and
said BIOS removes the first restriction when receiving the instruction from said restriction controlling utility of the OS, and keeps imposing the first restriction when not receiving the instruction.

2. The information processing apparatus according to claim 1,
wherein the BIOS is configured to
perform manager authentication at startup, and if the BIOS is activated by a manager right, replace the restriction information with restriction information indicating that no restriction is included.

3. The information processing apparatus according to claim 1, wherein the restriction setting utility is configured to
   instruct the BIOS to store the restriction information in the memory, and
   set the second restriction in the OS environment for restricting use of the device(s) after storage of the restriction information is verified.

4. The information processing apparatus according to claim 3,
   wherein the restriction setting utility is configured to instruct the BIOS to perform manager authentication at startup, and
   wherein the BIOS performs the manager authentication when the instruction to perform the manager authentication is received from the restriction setting utility.

5. The information processing apparatus according to claim 1,
   wherein the BIOS is configured to verify the validity of the restriction controlling utility if the instruction to remove the first restriction is received from the restriction controlling utility, and to remove the first restriction if the verification succeeds.

6. The information processing apparatus according to claim 1, further comprising:
   a plug-and-play (PnP) unit for performing a PnP function, wherein the BIOS is configured to request the PnP unit to rescan the device after the BIOS removes the first restriction.

7. The information processing apparatus according to claim 1, further comprising:
   a plug-and-play (PnP) unit for performing a PnP function, wherein the utility software is configured to request the PnP unit to rescan the device after the BIOS removes the first restriction.

8. The information processing apparatus according to claim 1, wherein the device is configured to set the second restriction in response to a command from the restriction controlling utility.

9. The information processing apparatus according to claim 1,
   wherein a plurality of USB devices including a USB storage device are connected to the apparatus,
   wherein the first restriction inhibits use of all of the plurality of USB devices, and
   wherein the second restriction inhibits only use of the USB storage device.

10. The information processing apparatus according to claim 1, further comprising:
    an optical disk drive,
    wherein the first restriction is configured to inhibit all the functions of the optical disk drive, and
    wherein the second restriction is configured to inhibit writing of data by the optical disk drive.

* * * * *